United States Patent [19]
Clerici et al.

[11] Patent Number: 6,022,623
[45] Date of Patent: Feb. 8, 2000

[54] COMPONENT FOR VEHICLE INTERIORS

[75] Inventors: Vittorio Clerici, München; Martin Muller, Wiesbaden; Klaus Steinberg, Mauern; Harald Markolwitz, Wolnzach; Anton Weber, München; Franz Hammer, Germering; Josef Huber-Hesselberger, München; Johann Weindl, Grosskarolinenfeld; Franz Wimmer, Reisbach; Gerhard Prechtl, Niederviehbach, all of Germany

[73] Assignees: Dow Coring GmbH, Wiesbaden; Bayerishe Motoren Werke Aktiengesellschaft, Munich, both of Germany

[21] Appl. No.: 08/910,855

[22] Filed: Aug. 13, 1997

[30]     Foreign Application Priority Data

Aug. 22, 1996  [DE]  Germany ........................ 196 33 947

[51] Int. Cl.$^7$ .......................... B32B 27/30; B32B 27/40; B60R 13/02
[52] U.S. Cl. ..................... 428/422; 296/39.1; 296/191; 296/214; 296/901; 427/389; 428/327; 428/423.1; 428/423.4
[58] Field of Search ................. 428/543, 423.1, 428/327, 422, 423.4; 296/39.1, 214, 901, 191, 146.7; 427/389

[56]         References Cited

U.S. PATENT DOCUMENTS

| | | |
|---|---|---|
| 4,798,341 | 1/1989 | Gimple ..................................... 239/694 |
| 4,937,010 | 6/1990 | Maillat ....................................... 252/27 |
| 5,264,270 | 11/1993 | Agrawal .................................... 428/192 |
| 5,507,869 | 4/1996 | Nyberg et al. .......................... 118/308 |
| 5,538,684 | 7/1996 | Luk et al. .................................. 419/66 |
| 5,716,057 | 2/1998 | Wright, Jr. et al. ....................... 279/62 |

FOREIGN PATENT DOCUMENTS

| | | |
|---|---|---|
| 441073 | 8/1991 | European Pat. Off. . |
| 3309776 | 9/1984 | Germany . |
| 3143746 | 6/1991 | Japan . |
| 8027409 | 1/1996 | Japan . |

OTHER PUBLICATIONS

Krytox(R) Dry Film Lubricants–General Overview (1996).
Krytox(R) DF Dispersions–Technical Information Oct. 1998
Krytox(R) Lubricants–General Overview Nov. 1997.
Automotive Engineering (May 1996); Dry Film Lubricant for Friction and Noise Reduction; vol. 104(5):101.
DuPont Material Safety Data Sheet; 10063PP; "Krytox" WDL10A Apr. 1999.
DuPont Material Safety Data Sheet; 10218PP; "WDL–5W" Apr. 1999.
DuPont Material Safety Data Sheet; 0646PP; "Krytox" DF50 Apr. 1999.

*Primary Examiner*—D. S. Nakarani
*Attorney, Agent, or Firm*—Alex Weitz

[57]         ABSTRACT

In order to effectively stop noises in the interior of a vehicle occurring to relative movements between individual components or a component and associated support part, it is proposed to coat them with a lacquer at the contact points.

14 Claims, 2 Drawing Sheets

COMPONENT FOR VEHICLE INTERIORS

FIELD OF THE INVENTION

The invention relates to a component, in particular interior panelling for vehicles, which, in use, has at least one surface in contact with another component, and which, in use, is subject to movement at the contact surface, relative to the other component. The invention also relates to a process for reducing noise produced where two components are in contact with one another and move relative to one another. Where the word component is used herein, it includes major components and smaller or minor components. Major components also include the support onto which another component may be fixed or located. Minor components include components which may be fitted or attached directly to a support or to another component.

BACKGROUND OF THE INVENTION

There is a general problem of noise generation in the interior of moving vehicles, e.g. when they travel, which results from the situation where two components which are in contact are subject to relative movement with respect to each other at the contact point. Causes of this are varied and cannot always clearly be identified.

One major cause lies in the fact that two components do not glide smoothly over each other, but move in a more stuttering fashion, which is also known by the term slip-stick effect.

In order to provide a solution to this problem, attempts have already been made by separating these surfaces of individual components where contact normally takes place either with their support part or with other components by applying a felt strip, foam film or textile tape at locations which cannot be seen from the outside. The noises which are known under the term "squeaking noises" should thereby be eliminated.

One disadvantage of this method is that space has to be provided for these additional materials. This may mean for example that upon dismantling of an interior door panel, which was attached without gap as a result of such material, one has no guarantee that these materials are still fully functional upon re-assembly.

SUMMARY OF THE INVENTION

The object of the present invention is to provide a solution here and indicate options on how to eliminate the so-called squeaking noises.

This object is achieved according to the invention as further described herein and as identified in the claims.

In particular the invention provides an article, especially an interior panelling component for a vehicle, being an article of manufacture having a first component and a second component, wherein at least a portion of a surface of said first component is in contact with at least a portion of a surface of said second component so as to form a common contact area along which said components can experience relative movement, wherein at least one of the surfaces in the contact area is coated with a substantially abrasion-resistant, low-friction coating comprising a solid lubricant and a binder in a weight ratio of 2 to 25 parts by weight of solid lubricant to 1 part by weight of binder. In another of its aspects, the invention provides a process for reducing noise in an article of manufacture having a first component and a second component, wherein at least a portion of a surface of said first component is in contact with at least a portion of a surface of said second component so as to form a common contact area along which said components can experience relative movement, said process comprising coating in the contact area at least one of the two components with a coating by applying a coating composition comprising 2 to 10 parts by weight of a binder based on polyurethane, 20 to 50 parts by weight of a polytetrafluoroethylene-based solid lubricant and 35 to 75 parts by weight of a liquid vehicle.

This solution has the advantage that because of the coating, which is usually applied at a thickness of only a few micrometers, no visible gap has to be maintained between the components which are in contact with each other or between the component and the support part. Hence these parts may be built without gaps. According to the invention it is immaterial whether the coating is applied to a component or to the support part. For reasons of ease of manufacture and technology, the component which will be selected to have the coating applied to, is the one which is easier to handle.

DETAILED DESCRIPTION OF THE INVENTION

Figure 1:
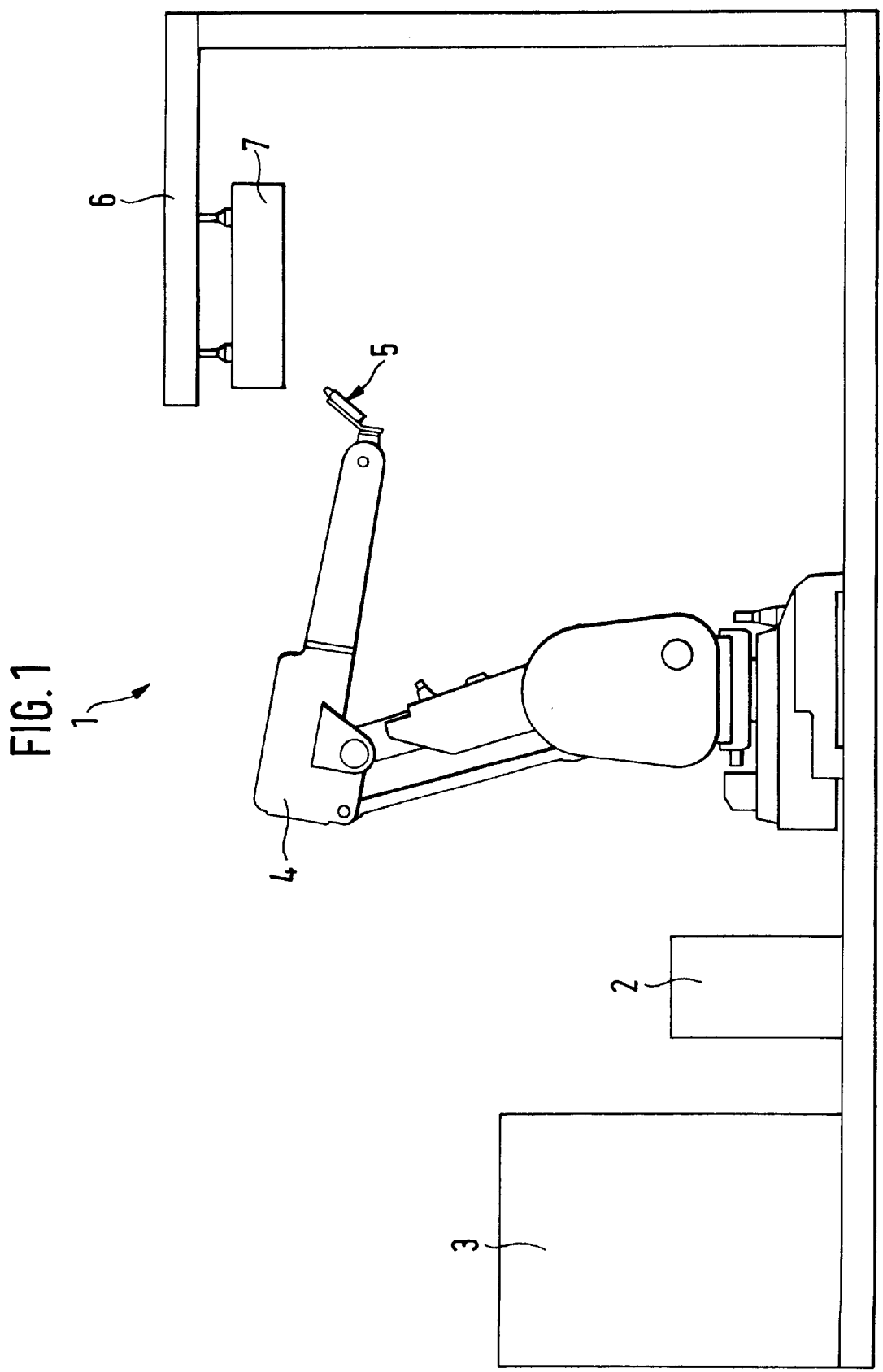
FIG. 1 is a schematic view of the construction of a coating room.

The raw material of the component is not relevant, hence for example hides, leather, artificial leather, lacquered surfaces, plastic surfaces, films or other materials conventionally used for vehicles, may be provided with the coating, whereby these components have surfaces of conventional quality in today's vehicle construction. The coating composition used in the invention is then applied to these known types of component surfaces to provide a coating. Relative movement of the components with respect to one another are not avoided in this way, but because of the application of the coating, it is ensured that noises, which occurred hitherto during relative movement of the components are reduced.

The coating composition is more fully described below, showing advantages of the more preferred materials. With the preferred coating compositions it is possible to obtain a completely clear or transparent coating, so that the coating composition may also be termed "clear lacquer". If so, the application process is eased, as any overspray of a clear lacquer cannot be seen with the naked eye even if it is present in visible areas of the component. Furthermore, components which cause squeaking noises may also be coated with it, even when they are intended to be located at least partly in visible areas. An example is an interior panelling for a door which abuts against dashboard panelling and which can be seen when the door is open.

A mixture of a binder with a solid lubricant and a solvent has proved to be particularly advantageous as coating composition. The coating composition thus preferably contains 2 to 10 parts by weight of binder, 20 to 50 parts by weight of solid lubricant and 35 to 75 parts by weight of a liquid vehicle.

In a preferred embodiment, up to two parts by weight of additives, for example a demulsifier, biocide and/or dispersion additives, may also be added. It is also possible that further components which are generally known are present, such as antioxidants, stabilisers, dyes, pigments, but their presence is not critical.

The binder is preferably a binder based on polyurethane, which is preferably supplied as a dispersion of, for example 25 to 50% by weight in a solvent, which is a liquid, preferably water. The preferred amount of binder used, as indicated above, means that the binder as provided when the coating composition is produced, may be from 4 to 40 parts by weight, preferably 5 to 10 parts by weight, if the binder is provided in the form of such a dispersion. Polyurethane binder materials are known in the art and are commercially available.

The solid lubricant is preferably a lubricant based on polytetrafluoroethylene polymers, which may also be provided as dispersions in a liquid for example from 40 to 75% by weight, preferably in water. The liquid present in the coating composition is also preferably water for environmental reasons.

The coating compositions may contain about 20 to about 65% by weight, preferably about 40 to 50% by weight of binder and solid lubricant combined, based on the total weight of the composition.

It is surprising that the coating compositions as described provides such good results, particularly in view of the fact that coating compositions for other lubricant applications conventionally have a weight ratio of lubricant to binder of 1.5:1 at the most. The preferred weight ratio of solid lubricant to binder in the coating compositions which are used according to the invention, is in the range from 5:1 to 20:1, and more preferably at least 10:1. Particularly preferred coating compositions accordingly comprise 2 to 7 parts by weight of binder, 30 to 50 parts by weight of solid lubricant and 40 to 60 parts by weight of water.

In a further development of the invention the size of the area on the surface of the component where the coating composition is applied slightly exceeds the area of the surface of the component which is intended for contact with another component. This provides the advantage that assembly tolerances may thus be taken into account.

In another development of the invention, it is preferred that the coating composition is applied with the aid of an industrial robot and an application nozzle. This application method is known per se for lacquers and is also recommended for applying the coating composition used in the present invention, which may be in the form of a clear lacquer.

The invention is described in some details in the exemplified embodiment below, where the word lacquer is used as an equivalent to coating composition.

FIG. 1 shows a lacquer application or coating room (1) schematically. A lacquer supply container (2), a metering system (3) for the lacquer, an industrial robot (4) with an application nozzle (5), a workpiece holder (6) and a workpiece (7) to be coated is shown in it. MOLYKOTE® D-96 from Dow Corning may be used by way of example as a suitable coating composition or lacquer.

Figure 2:
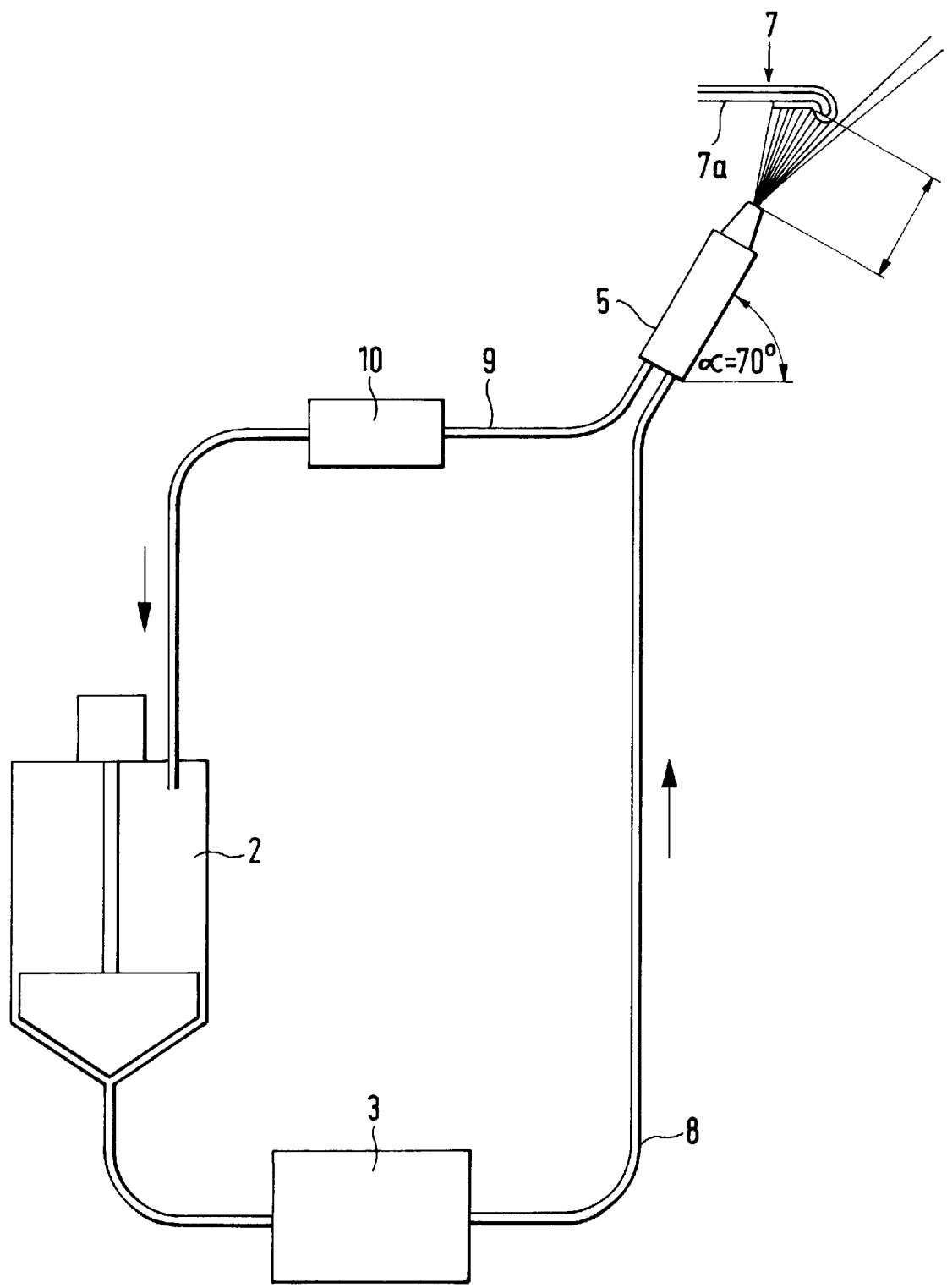
FIG. 2 is a schematic view of a lacquer circuit.

FIG. 2 describes the lacquer circuit in more detail. The lacquer is transported from the lacquer supply container (2), which is fitted with a stirring mechanism for optimum mixing of the lacquer, to a metering system (3) to control the quantities of lacquer which are applied. From there a lacquer flow pipe (8) leads to the application nozzle (5) which is held by an industrial robot (4) in the case of the exemplary embodiment according to FIG. 1.

A lacquer return pipe (9) runs from the application nozzle (5) via a return valve (10) to the lacquer supply container (2).

A workpiece (7) indicated only schematically is coated in FIG. 2 and is arranged such that it may be coated starting from its assembly side (7a) using an anti-squeak lacquer. The workpiece to be coated is thus positioned so that the lacquer may be applied to the assembly side only and does not cover any of the visible area. If necessary a cover for the transition point from the assembly area to the visible area may be made for this.

It has been established that a distance of 5 to 30 mm between the application nozzle and the lacquer application surface and an angle of 70° to the horizontal produces optimum results.

In this manner the anti-squeak lacquer may be applied with low material consumption in mass production. Further advantages of the lacquer lie in the fact that it is substantially low in weight, its service life corresponds to that of the vehicle and may be used independently of component design. Its durability is not influenced even by later dismantling and subsequent assembly or re-assembly of the coated component. This is particularly important for internal components in vehicles which possibly have to be dismantled in the course of the service life of the vehicles.

EXAMPLES

The examples below, where all parts, ratios and percentages are expressed by weight unless otherwise indicated, serve to further illustrate the invention.

Example

A coating composition was produced by mixing 10 parts by weight of a dispersion of a polyurethane binder, sold under the name SANCURE®, having about 30% by weight of a polyurethane solids content, 70 parts by weight of a 60% by weight PTFE dispersion in water, sold under the name HOSTAFLON® and 20 parts by weight of distilled water. The measured lubricant/binder solids ratio of the example is 13.125/1.

Comparative Example

A comparative composition was produced by using the same components as for the composition described above in the Example, but 10 parts by weight of the binder dispersion, 7.5 parts by weight of PTFE dispersion and 82 parts by weight of water. The measured lubricant/binder solids ratio of the comparative example is 1.4/1.

The example and comparative example compositions were applied by spraying onto a vehicle door in order to form a film having a thickness of 15 to 20 $\mu$m. The applied coating was allowed to dry. The coefficient of friction values (in $\mu$m) were then determined using a Polytester® apparatus, and specifically using a sliding rate of 1 cm/s and a polyoxymethylene (POM) ball bearing with a load of 50 to 550 g.

The coefficient of friction values in $\mu$ are given in the table below.

| Load (g) | Example | Comparative example |
|---|---|---|
| 50 | 0.080 | 0.104 |
| 100 | 0.062 | 0.120 |
| 150 | 0.059 | 0.114 |
| 200 | 0.062 | 0.122 |
| 250 | 0.061 | 0.127 |
| 300 | 0.063 | 0.134 |
| 350 | 0.067 | 0.140 |
| 400 | 0.070 | 0.146 |

-continued

| Load (g) | Example | Comparative example |
|----------|---------|---------------------|
| 450 | 0.073 | 0.150 |
| 500 | 0.077 | 0.156 |
| 550 | 0.081 | 0.158 |

The test results show clearly that the coating composition according to the example of the invention leads to a considerably improved (lower) friction coefficient, even at high load. The effect of noise reduction is such that a lower friction reduces the slip-stick effect.

That which is claimed is:

1. An interior paneling component for a vehicle comprising a first component and a second component, wherein at least a portion of a surface of said first component is in contact with at least a portion of a surface of said second component so as to form a common contact area along which said components can experience relative movement, wherein at least one of the surfaces in the contact area is coated with a composition comprising a solid lubricant and a binder in a weight ratio of 2:1 to 25:1, respectively.

2. The interior paneling component according to claim 1, wherein at least one of said first component or said second component is selected from the group consisting of hide, leather, artificial leather and plastic.

3. The interior paneling component according to claim 2, wherein the ratio of said lubricant to said binder is at least 10:1.

4. The interior paneling component according to claim 2, wherein said composition comprises 2 to 10 parts by weight of said binder, 20 to 50 parts by weight of said solid lubricant and 35 to 75 parts by weight of a liquid vehicle.

5. The interior paneling component according to claim 4, wherein said liquid vehicle is water.

6. The interior paneling component according to claim 4, wherein said binder is a polyurethane.

7. The interior paneling component according to claim 4, wherein said solid lubricant is a polytetrafluoroethylene.

8. The interior paneling component according to claim 4, wherein said composition is applied with the aid of an industrial robot and an application nozzle.

9. A method for reducing noise in an interior paneling component for a vehicle, said paneling component comprising a first component and a second component wherein at least a portion of a surface of said first component is in contact with at least a portion of a surface of said second component so as to form a common contact area along which said components can experience relative movement to produce the noise, said method comprising:

coating at least one of the surfaces in the contact area with
a composition comprising
(A) 2 to 10 parts by weight of a binder,
(B) 20 to 50 parts by weight of a solid lubricant and
(C) 35 to 75 parts by weight of a liquid vehicle.

10. The method according to claim 9, wherein at least one of said first component or said second component is selected from the group consisting of hide, leather, artificial leather and plastic.

11. The method according to claim 10, wherein said liquid vehicle is water.

12. The method according to claim 10, wherein said binder is a polyurethane.

13. The method according to claim 10, wherein said solid lubricant is a polytetrafluoroethylene.

14. The method according to claim 10, wherein said composition is applied with the aid of an industrial robot and an application nozzle.

* * * * *